United States Patent [19]

Chambers et al.

[11] Patent Number: 4,680,335

[45] Date of Patent: Jul. 14, 1987

[54] POLYMER COMPOSITIONS

[75] Inventors: Pauline B. Chambers; Stephen W. Bedder; Paul J. Akers, all of Coventry, United Kingdom

[73] Assignee: Courtaulds PLC, United Kingdom

[21] Appl. No.: 840,855

[22] Filed: Mar. 18, 1986

[30] Foreign Application Priority Data

Mar. 20, 1985 [GB] United Kingdom ............... 8507221

[51] Int. Cl.$^4$ ..................... C08J 3/02; C08K 3/20
[52] U.S. Cl. ................... 524/501; 524/504; 525/71
[58] Field of Search ............. 524/501; 525/71

[56] References Cited

U.S. PATENT DOCUMENTS

| | | | |
|---|---|---|---|
| 3,562,235 | 2/1971 | Ryan | 428/220 |
| 3,745,196 | 7/1973 | Lane | 525/292 |
| 3,787,522 | 1/1974 | Dickie et al. | 428/407 |
| 3,971,835 | 7/1976 | Myers et al. | 525/81 |
| 4,107,120 | 8/1978 | Plamondon et al. | 523/201 |
| 4,107,235 | 8/1978 | DeWitt, III | 525/212 |
| 4,141,935 | 2/1979 | Dunkelberger | 428/220 |
| 4,202,924 | 5/1980 | DeWitt, III | 428/201 |
| 4,277,384 | 7/1981 | Arkens | 524/460 |
| 4,351,875 | 9/1982 | Arkens | 428/290 |
| 4,420,583 | 12/1983 | Hutton | 524/501 |
| 4,423,165 | 12/1983 | Harper et al. | 524/501 |
| 4,489,180 | 12/1984 | Lundberg et al. | 524/501 |
| 4,517,333 | 5/1985 | Lundberg et al. | 524/501 |
| 4,536,539 | 8/1985 | Lundberg et al. | 524/501 |
| 4,598,111 | 7/1986 | Wright et al. | 524/501 |

FOREIGN PATENT DOCUMENTS 1583671 1/1981 United Kingdom .

*Primary Examiner*—Jacob Ziegler
*Attorney, Agent, or Firm*—Howson and Howson

[57] ABSTRACT

A polymer composition comprises a stable blend of two aqueous latices of particles having a polymeric core formed by emulsion polymerization of one or more olefinically unsaturated monomers and a polymeric shell formed on the core by emulsion polymerization of one or more olefinically unsaturated monomers in the presence of the core. The polymeric shell of the particles of the first latex contains functional groups capable of reacting with functional groups in the polymeric shell of the particles of the second latex to cause crosslinking between the particles of the two latices.

8 Claims, No Drawings

POLYMER COMPOSITIONS

FIELD OF THE INVENTION

This invention relates to aqueous polymer latices useful for forming coatings and moulded articles, particularly compression-moulded articles and films. In particular it relates to latices of particles having a polymeric core formed by emulsion polymerisation of one or more unsaturated monomers and a polymeric shell formed on the core by emulsion polymerisation of one or more unsaturated monomers in the presence of the core. It also relates to particulate compositions formed from such latices.

DESCRIPTION OF RELATED ART

Latices of the above-mentioned type are described for example in British Pat. No. 1583671 and U.S. Pat. Nos. 4,141,935 and 4,351,875. Coatings or films formed from such a latex may have an advantageous combination of the properties of the polymers of the core and shell. For example, the core may be an elastomeric polymer of low glass transition temperature (Tg) and the shell may be a hard polymer of high Tg, producing a latex which will form a hard coating of improved impact resistance.

The present invention seeks to provide aqueous polymer latices giving products of improved performance.

SUMMARY OF THE INVENTION

A polymer composition according to the invention comprises an aqueous latex of particles having a polymeric core formed by emulsion polymerisation of one or more olefinically unsaturated monomers and a polymeric shell formed on the core by emulsion polymerisation of one or more olefinically unsaturated monomers in the presence of the core, and is characterised in that the latex comprises a stable blend of two such latices, in which the polymeric shell of the first latex contains functional groups capable of reacting with functional groups in the polymeric shell of the second latex to cause crosslinking between the particles of the two latices.

Crosslinking of the particles of the two latices may take place on drying of the blended latex, which is particularly suitable for forming coatings. Alternatively, the functional groups may be such that crosslinking does not take place at room temperature, allowing the formation of a particulate dried latex which can be moulded and crosslinked at elevated temperature.

The invention also provides a particulate composition comprising particles having a polymeric core formed by emulsion polymerisation of one or more olefinically unsaturated monomers and a polymeric shell formed on the core by emulsion polymerisation of one or more olefinically unsaturated monomers in the presence of the core, and is characteridsed in that the composition is a stable blend containing two types of particles in which the polymeric shell of the first particles contains functional groups capable of reacting with functional groups in the polymeric shell of the second particles to cause crosslinking between the two types of particles. Such a blend of particles is preferably produced by drying a blend of two latices as defined above, but can alternatively be produced by separately drying two latices and blending the dried particles. Crosslinking of the particles is preferably effected by heating. Such blends of particles can for example be used as moulding compositions or as powder coatings.

Crosslinked coatings, films and moulded articles formed from the polymer compositions of the invention have improved impact resistance, scratch resistance and solvent resistance even compared to those formed from known latices of core and shell polymers.

In the formation of a latex of a core and shell polymer composition the monomer or monomers forming the core polymer are first polymerised by emulsion polymerisation, which can be carried out in conventional manner in the presence of an emulsifying surfactant and a free radical initiator. The monomer or monomers forming the shell polymer are added to the emulsion so formed. These monomers are then polymerised in or at the surface of the emulsion polymer particles, generally using further polymerisation initiator but without fresh surfactant.

The latices of the present invention may be latex-interpenetrating polymer networks in which the polymeric shell in each latex is crosslinked while in intimate mixture with the polymeric core, which is itself preferably crosslinked. Such crosslinking can be achieved by including a compound containing two olefinically unsaturated groups among the monomers which are polymerised both for the shell and for the core. In this case the monomers forming the shell polymer are preferably such that they swell the emulsion polymer particles of the core polymer.

In one type of polymer composition according to the invention the polymeric core in each latex has a lower Tg than the polymeric shell. In this case the polymeric core preferably has a Tg of below $-20°$ C., most preferably below $-40°$ C. Such a polymer can for example be formed from a monomer composition containing at least 70 percent by weight of an alkyl acrylate having at least 4 carbon atoms in its alkyl group, for example butyl acrylate, hexyl acrylate or 2-ethylhexyl acrylate, or a monomer composition containing at least 50 percent by weight of a conjugated diene such as butadiene or isoprene. Examples of comonomers which can be used with the higher alkyl acrylates are lower alkyl acrylates such as ethyl acrylate and alkyl methacrylates such as butyl methacrylate. Examples of comonomers which can be used with the conjugated dienes include acrylonitrile and styrene. A polymeric core formed from a monomer composition comprising at least 90 percent by weight butyl acrylate is particularly preferred. The polymeric shell preferably has a Tg of about $0°$ C. and can for example be based on a polymer containing at least 40 percent by weight of an alkyl methacrylate, for example methyl, ethyl or butyl methacrylate, or styrene. Particularly preferred polymeric shells are those containing at least 50 percent by weight methyl methacrylate with acrylic comonomers such as alkyl acrylates, for example ethyl acrylate or butyl acrylate. Such polymer compositions are particularly useful in forming impact-resistant coatings.

In another type of polymer composition according to the invention the polymeric core in each latex is a polymer containing at least 70 percent by weight vinylidene chloride units, with the polymeric shell in each latex being an acrylic polymer containing at least 50 percent by weight of units of at least one acrylic monomer. By an acrylic monomer we mean acrylic or methacrylic acid or an ester, amide or nitrile thereof. The core polymer can be a homopolymer of vinylidene chloride or can be a copolymer with up to 30 percent by weight of one or more comonomers such as vinyl chloride, acrylonitrile, methacrylonitrile, styrene or an acrylic ester, for example methyl, ethyl, butyl or hexyl acrylate or methyl or butyl methacrylate. The core polymer in this type of composition preferably contains at least 85 percent by weight vinylidene chloride units. The shell polymer preferably contains at least 50 percent by weight, most preferably at least 75 percent by weight, of at least one acrylic ester such as ethyl, butyl, methyl, propyl, hexyl, 2-ethylhexyl or hydroxyethyl acrylate or a corresponding methacrylate. Vinylidene chloride can be present as a comonomer in the shell polymer, for example in amounts up to 35 percent by weight. Other monomer units in the shell polymer can include styrene, acrylonitrile, methacrylonitrile, vinyl chloride or vinyl acetate. Such polymer compositions are particularly useful in forming coatings which have a low transmission of gases and vapours and are resistant to solvents and chemicals but adhere to substrates such as metal or plastics, for example polyester, better than most vinylidene chloride polymer latices.

The two latices in the polymer compositions of the invention generally have a similar chemical composition apart from the functional groups which react to cause crosslinking. The same polymeric core can conveniently be used for both latices; for example a batch of the emulsion of the core polymer is prepared and is divided into portions and the monomer compositions forming the two polymeric shells are polymerised separately in the presence of these portions of the core emulsion.

Examples of pairs of functional groups which will react to cause crosslinking between the particles of the two latices include acid groups reacting with the N-methylol amide groups, which may be etherified; epoxy groups reacting with hydroxyl, carboxylic acid or amine groups; and carboxylic acid groups reacting with hydroxyl groups. The monomer(s) containing functional groups usually comprises 1-20 percent, preferably 2-10 percent, by weight of the monomers forming the shell polymer.

Preferred reactive functional groups which crosslink on drying, particularly for forming coatings, are N-methylol amide groups reacting with acid groups. For example one latex may contain 2-10 percent by weight of an olefinically unsaturated acid such as acrylic acid, methacrylic acid, maleic acid or itaconic acid in the polymeric shell while the other latex may contain 2-10 percent by weight of an N-substituted amide such as N-methylol acrylamide or N-methylol methacrylamide. Alternative reactive groups crosslinking on drying are epoxy groups and amine groups. For example one latex may contain glycidyl methacrylate in the polymeric shell while the other may contain dimethylaminoethyl methacrylate or t-butylaminoethyl methacrylate. Groups derived from the etherified N-methylol acrylamide monomer

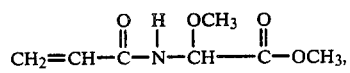

which is available commercially under the trade name 'MAGME', also crosslink on drying when reacted with primary amine groups.

Crosslinking of the above functional groups occurs on drying. The coating may however be heated, for example at 50°-100° C., to ensure more extensive crosslinking.

Examples of reactive groups crosslinking on heating include epoxy groups, e.g. derived from glycidyl methacrylate, reacting with hydroxyl groups derived from hydroxyethyl acrylate or methacrylate, acid groups derived from methacrylic or acrylic acid or amine groups. Esterified N-methylol amide groups derived for example from N-methoxymethyl acrylamide, N-isobutoxymethyl acrylamide or 'MAGME' crosslink with acid groups on heating. Acid groups and hydroxyl groups, for example derived from the monomers described above, can also give crosslinking at higher temperatures.

The polymeric core is preferably formed from a monomer composition containing 0.2 to 8 percent by weight, most preferably 1 to 5 percent, of a polyunsaturated monomer forming crosslinks within the polymeric core, for example a diacrylate or dimethacrylate such as ethylene glycol diacrylate, ethylene glycol dimethacrylate, diethylene glycol dimethacrylate or 1,4-butanediol dimethacrylate. Each polymeric shell may be formed from a monomer composition containing 0.2-3 percent by weight of a similar polyunsaturated monomer, most preferably 0.5-2 percent.

The emulsifier for the emulsion polymerisation of the polymeric core is preferably an anionic surfactant, for example a monophosphate or monosulphate of an ethoxylated alkyl phenol (this is the most preferred surfactant), a long chain sulphate such as sodium lauryl sulphate or an alkyl benzene sulphonate. The emulsifier is preferably used at 0.1-5 percent based on the total weight of polymer in the final polymer composition. Higher amounts within this range, for example 1-5 percent by weight, are preferred for compositions having a core of a vinylidene chloride polymer and lower amounts, for example 0.1-2 percent by weight, are preferred for compositions having an acrylate polymer core.

The polymerisation initiator used in each step of the emulsion polymerisation can in general be any of those free radical initiators known for addition polymerisation, for example a persulphate such as potassium persulphate, an azo catalyst such as azobisisobutyronitrile or an organic peroxide or per-ester. The free radical initiator may be of the redox type, for example persulphate with metabisulphite or dithionite. The amount of initiator used is generally 0.05-1.0 percent by weight based on the monomer(s) forming the polymeric core in the first stage of the emulsion polymerisation, with a further addition of 0.05-1.0 percent by weight initiator based on the monomer(s) forming the polymeric shell in the second stage of the emulsion polymerisation. The temperature of polymerisation is in general in the range 10°-120° C. but lower temperatures within this range may be necessary when the polymeric shell formed in the second stage of polymerisation contains a functional group capable of self-condensation at elevated temperature. For example, when a polymer is formed containing N-methylol amide groups which are not etherified the temperature of polymerisation is preferably kept below 50° C. In this case the polymerisation initiator used should preferably be a redox system, most preferably with a catalyst for the initiator, for example a cupric/ferrous couple such as copper sulphate and ferrous ammonium sulphate. Such catalysed redox systems are effective for initiation of polymerisation at ambient temperatures such as 20°-30° C. Low temperature polymerisation may also be preferred when polymerising monomer compositions containing vinylidene chloride which boils at 32° C., although this monomer can alternatively be polymerised at higher temperatures under pressure.

In both the core and shell stages of emulsion polymerisation the monomer(s) used may all be present in the emulsion initially or part can be added continuously during the polymerisation.

The invention is illustrated by the following Examples in which parts and percentages are by weight.

EXAMPLE 1

(i) Preparation of Core Latex (Poly-butylacrylate)

40 g of Fenopon EP120 or similar emulsifier (monosulphate of an ethoxylated nonylphenol—28 percent active) was dissolved in 1200 g distilled water. The pH was adjusted to 7.8 with dilute sodium hydroxide and the solution stirred under nitrogen for 30 minutes. 2 g potassium persulphate was then dissolved in the solution. A monomer blend consisting of 768 g butyl acrylate and 32 g ethylene glycol dimethacrylate (EGDM) was formed and 20 g of the blend was added to the emulsifier/initiator solution and the temperature raised to 85° C. The emulsion was held at that temperature for 5 minutes, the source of heat switched off, and the rest of the monomer blend run in at a rate sufficient to maintain the temperature at 85° C. The temperature was held at 85° C. for 30 minutes after all the monomer had been added and then the latex cooled. Latex solids 39.3 percent.

(ii) Preparation of Latex A 250 g of the core latex was mixed with 500 g distilled water and stirred under nitrogen. 2 ml of a 25 g/l copper sulphate solution and a few drops of a 39.2 g/l ferrous ammonium sulphate solution were added. A monomer blend consisting of 228 g methyl methacrylate, 152 g butyl acrylate and 4 g of EGDM was formed and 50 ml of the monomer blend were also added, and the mixture was stirred for 30 minutes at 25° C. A solution in water of N-methylol acrylamide was made up (20 g N-methylol acrylamide in 40 ml water) to be fed in, in addition to the monomer blend feed. 4 ml each of a 25 g/l ammonium persulphate solution and a 10.8 g/l sodium metabisulphite solutions were added and 3 ml of each of the solutions were added thereafter every 10 minutes for 1 hour 30 minutes. The remainder of the monomer blend and the N-methylol acrylamide solution were added over this time. At the end of the feed time 4 ml each of the ammonium persulphate and sodium metabisulphite solutions were added and the emulsion stirred for 30 minutes.

(iii) Preparation of Latex B 250 g of the core latex was mixed with 600 g distilled water containing 2 g of dissolved potassium persulphate. The mixture was stirred under nitrogen. A monomer blend consisting of 228 g methylmethacrylate, 152 g butyl acrylate, 20 g acrylic acid, and 4 g EGDM was made up, and 100 ml of this added to the stirred core latex. After 30 minutes the temperature was raised to 80° C. As soon as an exotherm was seen the remaining monomer blend was added at such a rate as to maintain the exotherm. The latex was then left to fully react for 1 hour and finally cooled.

Latex A and Latex B were blended in equal quantities and gave a stable product which crosslinked on drying. A small amount of heat, for example at 50°–80° C., accelerated the crosslinking process. The blended latex was cast to give a 500 μm dry film thickness and dried at 60° C. for 24 hours. The crosslinked film had an impact strength of 11.7J as compared to 7.8J for an uncrosslinked core/shell polymer of similar composition but omitting the N-methylol acrylamide and acrylic acid.

EXAMPLE 2

(i) Preparation of Core Latex (Polyvinylidene Chloride)

Perlankrol FN65 emulsifier (nonyl phenol ether sulphate, sodium salt) (74 g) was dissolved in distilled water (1900 ml) together with sodium methallyl sulphonate (14.5 g) and ferrous ammonium sulphate (1.6 ml of a 39.2 g/l soln.). The pH of the resulting solution was adjusted to 3.65 using 2.5 molar sulphuric acid. The solution was stirred under nitrogen for 30 minutes at 25° C.

A mixture of vinylidene chloride (416 g), and ethylene glycol dimethacrylate (26 g) was then added, and the rate of stirring increased to emulsify the monomers. 8 ml of a solution of ammonium persulphate (50 g/l) was added followed by 8 ml of a solution of sodium metabisulphite (21.6 g/l) to initiate polymerisation. Thereafter, 6 ml of each of these solutions was added every 10 minutes for a total of 150 minutes and, concurrently, a mixture of vinylidene chloride (210 g) and ethylene glycol dimethacrylate (12 g) was added for the first 120 minutes. At the end of the reaction the latex was stirred under nitrogen for 30 minutes to polymerise any residual monomers.

(ii) Preparation of Latex A 1423 g of the core latex was stirred under nitrogen at 25° C. for 30 minutes. A blend of vinylidene chloride (13.7 g), ethyl acrylate (95 g) and ethylene glycol dimethacrylate (0.43 g) was added to the latex and stirring continued for a further 30 minutes. At the end of this period the initiator feeds were commenced at the same rate as described in part (i) for 160 minutes. Simultaneously, a blend of vinylidene chloride (27.2 g) and ethyl acrylate (189.4 g) was fed into the reactors for a period of 130 minutes (Feed I). Ten minutes after the commencement of monomer Feed I a solution of N-methylol acrylamide (78.9 g of a 48 percent solution in water) (Feed II) was added at such a rate that the addition of Feeds I and II were completed at the same time.

At the end of this procedure, the latex was stirred for a further 30 minutes and then filtered and stored.

(iii) Preparation of Latex B 1423 g of the core latex was stirred under nitrogen at 25° C. for 30 minutes. A blend of vinylidene chloride (9.9 g), ethyl acrylate (68.2 g) and ethylene glycol dimethacrylate (0.213 g) was added to the latex and stirring continued for a further 30 minutes. The initiator feeds were then recommenced at the same rate as above for 130 minutes. Simultaneously, a blend of vinylidene chloride (27.9 g), ethyl acrylate (114.6 g) and methacrylic acid (17 g) was added over 100 minutes. The latex was filtered and stored.

Latex A was added to Latex B in equal quantities. The resulting stable latex had a solids content of 37 percent.

The latex was coagulated and the polymer isolated was dried for 18 hours at 50° C. Its solvent resistance was then tested by immersion in three aggressive organic solvents for 24 hours. The degree of swelling of the polymer was 174 percent in tetrahydrofuran (THF), 59.5 percent in methyl ethyl ketone (MEK) and 49.3 percent in xylene.

By comparison, a polymer produced by the same core/shell polymerisation procedure from the same monomers, except that the N-methylol acrylamide and methacrylic acid were omitted, broke up in all 3 solvents.

EXAMPLES 3 to 7

A series of latices were produced using the procedure of Example 2. The core latex was in each case produced as described in Example 2(i). The shell of each latex was produced from varying monomer compositions as described in Table 1 below, replacing the vinylidene chloride and ethyl acrylate in Example 2(ii) and (iii). In each Example two latices were prepared containing different crosslinking monomers; the main monomers in the shell were the same in both latices. The procedure of Example 2(ii) was used to prepare latices containing N-methylol acrylamide. Latices containing other crosslinking monomers were prepared according to Example 2(iii), with an equimolar amount of glycidyl methacrylate or hydroxyethyl methacrylate replacing methacrylic acid where required.

In each case the polymer was isolated and dried as described in Example 2 and the degree of swelling was measured in THF, MEK and xylene.

TABLE 1

| Example Number | Shell Composition % by Weight | Crosslinking System | Percent Swelling | | |
|---|---|---|---|---|---|
| | | | THF | MEK | Xylene |
| 3 | 15 acrylonitrile 85 ethyl acrylate | N—methylolacrylamide/ methacrylic acid | 191% | 96% | 30.5% |
| 4 | 15 acrylonitrile 85 ethyl acrylate | N—methylolacrylamide/ glycidyl methacrylate | 150% | 70% | 28% |
| 5 | 100 ethyl acrylate | N—methylolacrylamide/ glycidyl methacrylate | 137% | 66% | 50.6% |
| 6 | 20 vinylidene chloride 80 ethyl acrylate | N—methylolacrylamide/ glycidyl methacrylate | 136% | 59.5% | 46.5% |
| 7 | 15 acrylonitrile 85 ethyl acrylate | Hydroxyethyl methacrylate/ glycidyl methacrylate | 239% | 126% | 35.9% |

EXAMPLE 8

An impact-resistant polymer was prepared using the process of Example 1 but with a different composition in the polymeric shell of one latex. A core latex was prepared as described in Example 1(i) and a core/shell latex B containing acid groups was prepared as described in Example 1(iii).

Preparation of Core/Shell Latex A 250 g of the core latex prepared in Example 1 (i) was mixed with 500 g distilled water and stirred under nitrogen. 2 ml of a 25 g/l copper sulphate solution and a few drops of a 39.2 g/l ferrous ammonium sulphate solution were added.

50 ml of a monomer blend consisting of 190 g methyl methacrylate, 190 g butyl acrylate and 4 g of ethylene glycol dimethacrylate were also added, and the mixture was stirred for 30 minutes at 25° C. A solution in water of N-methylol acrylamide (50% w/w) was made up to be fed in, in addition to the monomer blend feed. 4 ml each of a 25 g/l ammonium persulphate solution and a 10.8 g/l sodium metabisulphite solution were added and 3 ml of each of the solutions were added thereafter every 10 minutes for 1 hour 30 minutes. The monomer blend and 45 ml N-methylol acrylamide solution were added over this time. The initiator feeds were continued for a further half hour after all the monomers were added. The emulsion was stirred for 0.5 hour at room temperature.

The latices A and B were blended in equal proportions to give a latent crosslinking system.

We claim:

1. An aqueous polymer latex composition which is a stable blend of two aqueous polymer latices (A) and (B), said latices (A) and (B) each comprising polymer particles having a polymeric core formed by emulsion polymerisation of one or more olefinically unsaturated monomers and a polymeric shell formed on the core by emulsion polymerisation of one or more olefinically unsaturated monomers in the presence of the core, the polymeric shell of the emulsion polymer particles of latex (A) containing functional groups capable of reacting with functional groups in the polymeric shell of the emulsion polymer particles of latex (B) to cause cross linking between the particles of the two latices.

2. A polymer latex composition according to claim 1, in which the polymeric core in each latex has a glass transition temperature (Tg) lower than that of the polymeric shell.

3. A polymer latex composition according to claim 2, in which each polymeric core has a Tg of below −20° C. and each polymeric shell has a Tg of about 0° C.

4. A polymer latex composition according to claim 3, in which each polymeric core comprises at least 70 percent by weight of units of an alkyl acrylate having at least 4 carbon atoms in its alkyl group and each polymeric shell comprises at least 40 percent by weight of units selected from alkyl methacrylate and styrene units.

5. A polymer latex composition according to claim 1, in which each latex has a polymeric core comprising at least 70 percent by weight of vinylidene chloride units and a polymeric shell comprising at least 50 percent by weight of acrylic monomer units.

6. A polymer latex composition according to claim 1, in which the polymeric shell in each latex comprises 2-10 percent by weight of monomer units providing the said reactive functional groups.

7. A polymer latex composition according to claim 1, in which the functional groups in the shell of latex (A) are acid groups and the functional groups in the shell of latex (B) are N-methylol amide groups.

8. A polymer latex composition according to claim 1, in which the functional groups in the shell of latex (A) are acid groups and the functional groups in the shell of latex (B) are etherified N-methylol amide groups.

* * * * *